March 11, 1952      J. G. LINDEMAN      2,589,104
HYDRAULIC TOOL SUPPORTING STRUCTURE
Filed Oct. 26, 1945      3 Sheets-Sheet 1
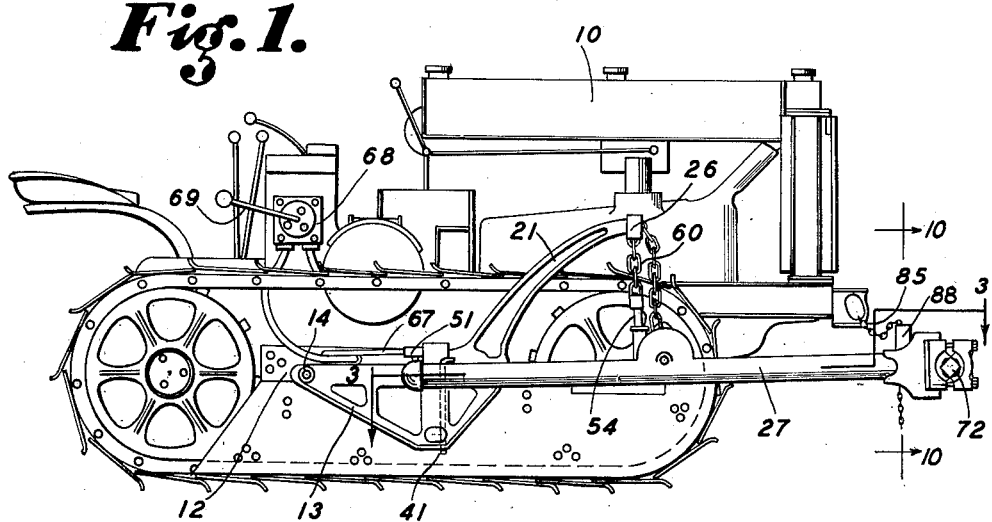
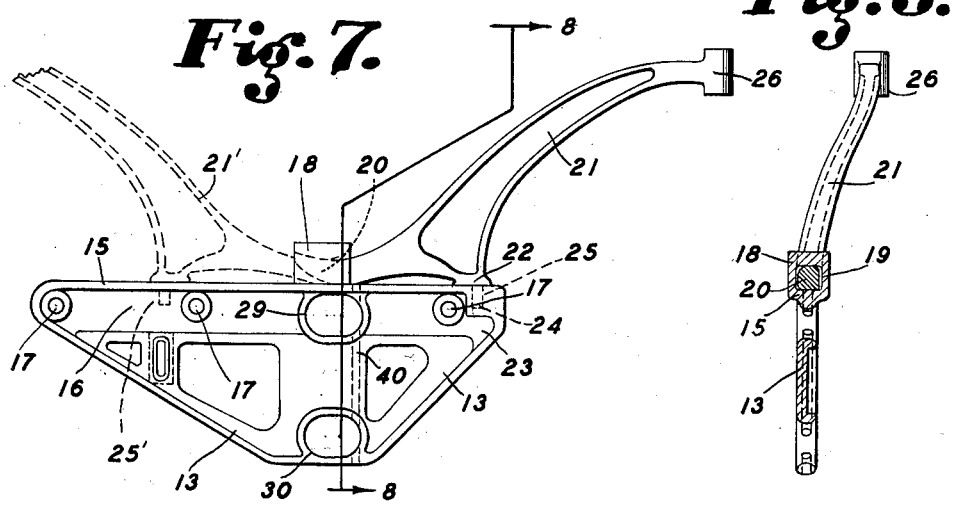
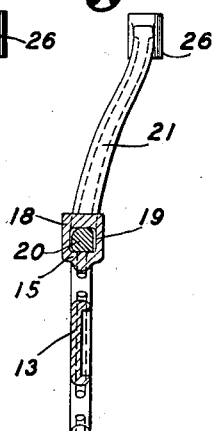
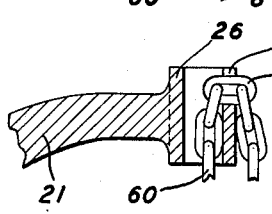
INVENTOR.
JESSE G. LINDEMAN
ATTORNEY

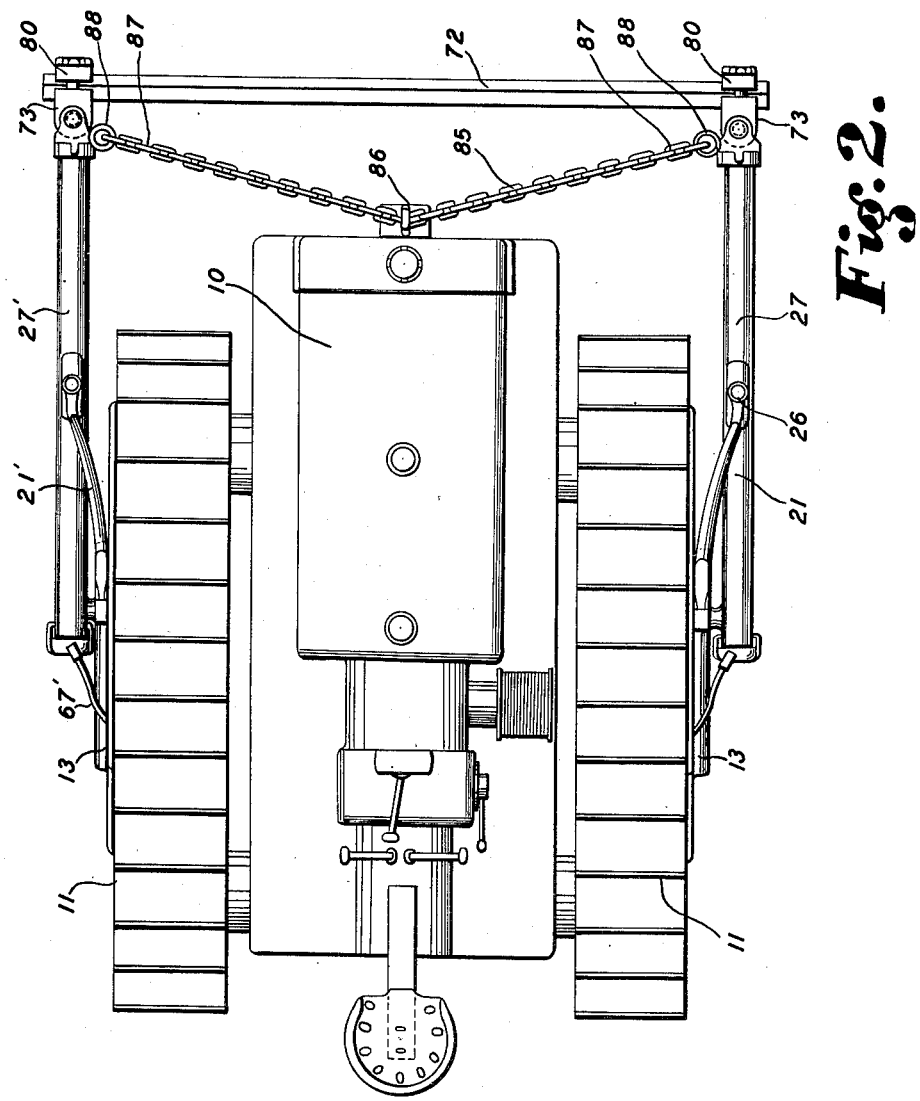

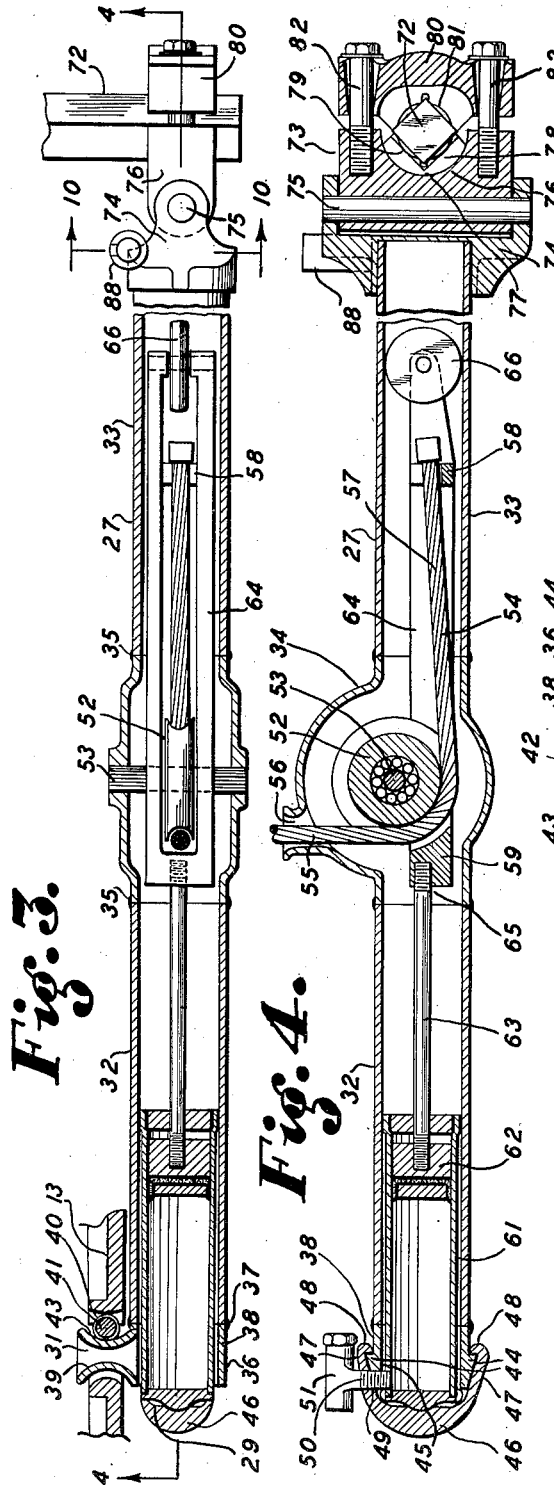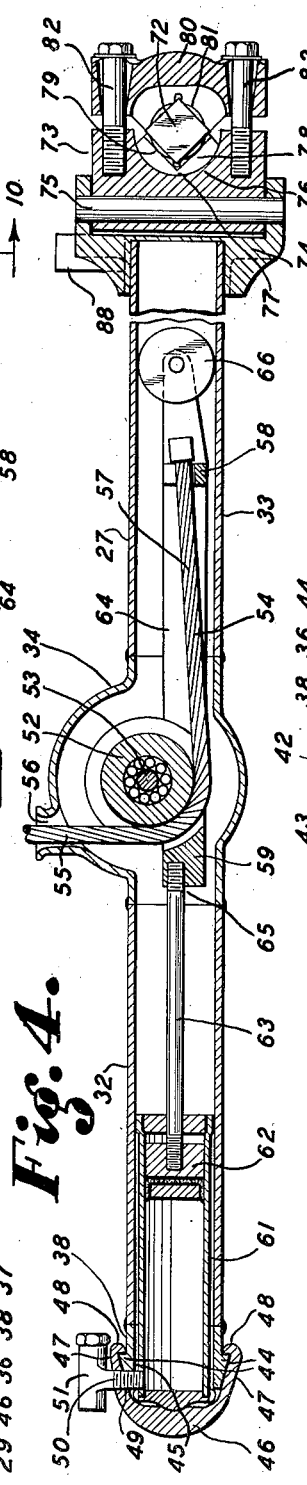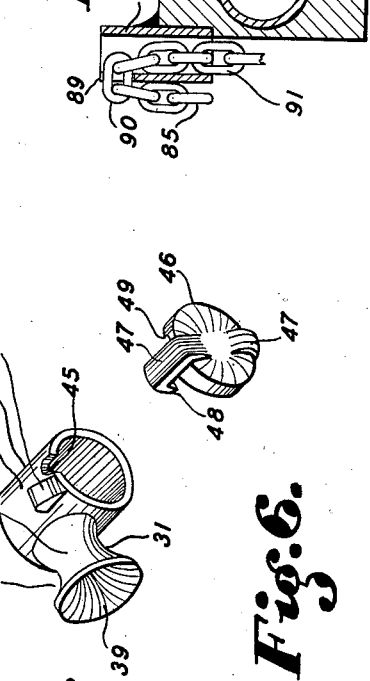

Patented Mar. 11, 1952

2,589,104

UNITED STATES PATENT OFFICE 2,589,104

HYDRAULIC TOOL SUPPORTING STRUCTURE

Jesse G. Lindeman, Yakima, Wash., assignor, by mesne assignments, to Deere & Company, Moline, Ill., a corporation of Illinois Application October 26, 1945, Serial No. 624,725

20 Claims. (Cl. 97—50)

My invention relates to a tool attachment for tractors of either track laying or wheeled type, for supporting various ground working tools in operative relation either at the front or the rear of the tractor.

It is an object of the invention to provide a tool supporting attachment of simple and durable form which may be quickly changed from a position to support the tools at the front of the tractor to a position supporting the tools at the rear of the tractor, wherein the reversal of the position of the attachment is accomplished by use of the same parts and without need for additional parts in either position, a special feature of the invention being that the tool attachment may be completely attached or detached from the tractor without the use of a wrench or special tool of any kind. When the attachment is used on a track laying type tractor, it is ordinarily equipped with a gauge wheel which rolls over the ground, for the reason that the bucking of a track laying tractor over rough ground prevents uniform penetration of tools carried by the attachment. When the attachment is employed on a wheeled tractor, the gauge wheel is removed therefrom.

It is an object of the invention to provide a tool attachment for tractors having power means incorporated therein whereby it may be raised and lowered.

A further object of the invention is to provide a novel and simple manner of incorporating power means in the tool attachment.

A further object of the invention is to provide a tool attachment for connection to the tractor so that it may be raised and lowered, this tool attachment having a pull exerting power device incorporated therein, which is connected to the lower end of the tension member, the upper end of the tension member being connected to a bracket on the tractor, whereby the reaction of the pull exerted on the tension member will lift the tool attachment.

A further object of the invention is to provide a tool attachment of the character set forth in the preceding paragraph wherein parts of the tool attachment are of hollow construction and the power means for raising the tool attachment are disposed in chambers in the hollow parts of the attachment.

A further object of the invention is to provide a tool attachment having lever arms for extension along the sides of the tractor, these lever arms being tubular and having therein the power mechanism for raising and lowering the attachment relatively to the tractor.

A further object of the invention is to provide a tool attachment having tubular lever arms with cylinder-piston means disposed within the tubular lever arms and movable parts whereby the actuation of the cylinder-piston means will apply tension to a tension member by which raising and lowering of the attachment is accomplished.

A further object of the invention is to provide a tool attachment for tractors having lever members to extend along the sides of the tractor and simple means for attaching these lever members to the sides of the tractors, whereby the attachment is supported in a manner such that it may swing both vertically and laterally, and may be attached to or removed from the tractor without use of a wrench or special tools.

A further object of the invention is to provide in the tool attachment simple cooperating parts which are interlocked upon assembly, thereby minimizing the use of screws, bolts, and nuts in the assembly of the device and in its attachment to the tractor.

A further object of the invention is to provide a tool attachment having side levers for pivotal attachment to the tractor and a tool bar adjustably connected to the outer ends of the lever arms so that such tool bar may be rotated around a center line extending substantially parallel to its axis, or preferably coinciding with its axis. This means for rotational adjustment of the tool bar provides a simple tilting mechanism for changing or adjusting the working relation of the tools to the ground. The various tools which may be supported by the attachment need slight suction adjustment for different soils, and also for the different heights at which the tool bar operates from the ground. My invention incorporates a simple means for providing this adjustment.

A further object of the invention is to provide at the outer ends of the levers of the tool attachment a simple means for adjusting the level of the tool bar which extends across the outer ends of the levers, thereby making it possible to adjust the tool attachment so that its tool bar will be exactly levelled with relation to the tractor, or so that one end or the other of the tool bar may be raised or lowered, or, in other words, so that the transverse tool bar will be maintained in a tilted or sloping position.

Further objects and advantages of the invention will be brought out in the following part of the specification.

Referring to the drawings which are for illustrative purposes only:

Fig. 1 is a side view showing an embodiment of my invention attached to a tractor.

Fig. 2 is a slightly enlarged plan view corresponding to Fig. 1.

Fig. 3 is a sectional view taken as indicated by the line 3—3 of Fig. 1, to enlarged scale.

Fig. 4 is a sectional view taken as indicated by the line 4—4 of Fig. 3.

Fig. 5 is a perspective view of the pivot attachment shown in section in Fig. 3.

Fig. 6 is a perspective view of the cap which corresponds with the fitting shown in Fig. 5.

Fig. 7 is an enlarged view of the attachment bracket and supporting arm shown in Fig. 1.

Fig. 8 is a sectional view taken as indicated by the line 8—8 of Fig. 7.

Fig. 9 is a fragmentary sectional view of the upper end of the supporting arm.

Fig. 10 is a sectional view taken as indicated by the lines 10—10 of Figures 1 and 3 to show adjustable chain attachment.

For the purpose of illustration I have shown my invention in use with a tractor 10 of track type having treads or tracks 11 operatively supported at the sides thereof. This tractor is of a commercial type extensively used and has at each side track supporting elements 12 to which I attach the plates or brackets 13 of my invention by means of bolts 14. As shown to a large scale in Fig. 7, each bracket has an upper flat wall 15 from which a metal web 16 extends downward, this web having therein bolt holes 17 to receive the attachment bolts 14. Projecting from the upper wall 15 to the bracket 13 there is a socket part 18 having therethrough a longitudinal opening 19 which receives the toe 20 of a supporting arm or bracket 21. The supporting arm or bracket 21 has near the forward end of its base portion a pad 22 which rests upon the upper face of the wall 15 at a point near the front end 23 of the bracket 13. The support 21 has, extending downward from the pad 22, a projecting pin 24 which enters an opening 25 in the bracket 13 when the member 21 is in its forwardly extending position shown in Figs. 1, 2 and 7. The opening 19 in the socket part 18 is of rectangular cross section, and the toe 20 is of corresponding rectangular cross section so that the part 20 cannot rotate within the opening 19 and therefore the supporting arm 21 is maintained in the erect position in which it is shown. When a downward force is exerted upon the forward tubular end 26 of the support 21, the support 21 will tend to rotate in clockwise direction around the pad 22, but this rotation will be prevented by the interengagement of the toe 20 with the socket part 18 of the bracket 13.

It will be understood that the brackets 13 on opposite sides of the tractor 10 are symmetrical in form but are made in right and left hand relation. As will be perceived in Fig. 2, the bracket 21 on the near side of the tractor 10 bends outwardly so that its forward end 26 will lie substantially above the center line of the tubular lever 27. A similar lever 21', shown on the far side of the tractor 10 in Fig. 2, extends opposite hand so that it will lie above a lever member 27' on the far side of the tractor.

As further shown in Fig. 7, the bracket 13 has in the upper part of the web 16 below the socket part 18 an oval transverse opening 29 and near the lower part of the bracket 13 there is a similar transverse opening 30 substantially vertically aligned with the opening 29, the openings 29 and 30 being adapted to receive a pivot extension 31 which projects from the left end of the lever 27 toward the tractor, the relative position of the pivot extension in the upper opening 29 of the bracket 13 being shown to enlarged scale in Fig. 3. The lever members 27 and 27' are of similar construction, but have the parts thereof disposed in opposite hand relation; therefore the details of only the lever member 27 need be shown to enlarged scale and described.

In Figs. 3 and 4 I have shown rearward and forward tubes 32 and 33 connected to the opposite ends of a cast steel housing 34 by welds 35. The members 32 and 33 are pieces of standard steel tubing or pipe. To the rear end of the member 32 a cast steel pivot part 36 is welded as indicated at 37. This pivot part 36 is shown in perspective in Fig. 5. It consists of a short tubular section 38 which is aligned with the tube 32. The pivot extension 31 projects leftwardly from the tubular section 38 and is cast integrally therewith. The extension 31 has an oval outer end 39 corresponding in general to the shape of the openings 29 and 30 but being of slightly smaller size so as to pass thereinto with sufficient clearance, to enable a slight rocking movement of the extension 31 on its axis through an arc which will permit raising and lowering of the front or rightward end of the lever 27. The bracket 13 has therein a vertical opening 40 which intersects the rightward ends of the openings 29 and 30. When the extension 31 is inserted in either the opening 29 or 30, a pin 41 may be lowered into the vertical opening 40, portions of this pin then lying in the forward parts of the openings 29 and 30 so as to make locking engagement with the pivot extension 31. For example, as shown in Figs. 3 and 5, the extension 31 has the intermediate portion 42 thereof diametrally reduced so as to provide a circumferential depression or channel 43 of shallow form in which a portion of the pin 41 may lie as shown in Fig. 3, the engagement of the pin 41 with the channel 43 preventing removal of the pivot extension 31 from the opening, 29 for example, in which it is placed.

As shown in Figs. 4 and 5, the pivot part 36 has on the outer end of its tubular section 38 diametrally opposed lugs 44, and adjacent the upper lug 44 a notch 45 is formed in the outer end of the tubular section 38. To cover the outer end of the section 38 I provide a cap 46 from which upper and lower fingers 47 are extended forwardly across the outer portions of the tubular section 38, these fingers 47 having at their forward ends hooks 48 to engage the forwardly faced shoulders of the lugs 44 when the fingers 47 are, by rotation of the cap 46, brought into positions overlying the lugs 44. The cap has in its inner edge a notch 49 of semicircular cross section positioned adjacent to the upper finger 47 so that when the cap 46 is rotated into a position wherein the fingers 47 will interlock with the lugs 44, the notch 49 will be aligned with the notch 45, thereby providing an opening to receive the threaded nipple portion 50 of a hydraulic fitting 51.

The housing 34 has therein a sheave 52 supported on a transverse axle 53 over which a pulling member 54, shown as a cable, extends, the rising portion 55 of this cable extending through an opening 56 in the upper portion of the housing 34, and the horizontal portion 57 of the cable 54 being attached to the forward part 58 of a pulling mechanism 59. The upper end of the cable 54, as shown in Fig. 1, is connected by a chain 60 to the forward end 26 of the supporting member 21. When the pulling mechanism 59 is actuated from a retracted position into the forward position in which it is shown in Figs. 3 and 4, the cable 54 will be pulled into the interior of the hollow lever arm 27, and the upward reaction of the cable against the sheave 52 will raise the arm 27.

The pulling mechanism 59 comprises a hydraulic cylinder 61 disposed in the rearward end of the tube 32, a piston 62 operative within the cylinder 61, a forwardly extending piston rod 63 and a frame member 64 which is connected to the forward end of the rod 63, this frame member having bifurcated so that it straddles the pulley as shown in Fig. 3. The part 58, to which the cable 54 is attached, is a part of the frame member 64. At the front end of the frame member 64 a roller 66 is supported so that it will roll forwardly and rearwardly in the tube 33 as the pulling mechanism is actuated. As shown in Fig. 4, the nipple 50 of the hydraulic fitting 51 threads into the rearward portion of the cylinder 61 so as to provide hydraulic connection with the cylinder 61. As shown in Fig. 1, a hydraulic conduit 67 extends to a source of hydraulic fluid pressure 68 forming part of the tractor equipment or added thereto for this particular purpose. By operation of a lever 69 the operator of the tractor may deliver hydraulic pressure into the cylinder 61 to move the piston 62 forwardly, thereby exerting a pull on the cable 54 to pull the cable into the tubular lever 27 and thereby cause the same to rise. Likewise, operation of the lever 69 will release fluid pressure from the cylinder 61 and permit the piston 62 to move rearward so that the cable 54 will pass out through the opening 56 and permit the arm 37 to swing downward. The operative position of the cable 54 is adjusted by adjusting the chain 60 with relation to the tubular forward end 26 of the supporting member 21. As shown in Fig. 9, the chain 60 is carried up through the tubular member and one of its links 70 is placed in a slot 71 of the tubular part 26. By selecting the link 70, which is to engage the slot 71, the length of the portion of the chain downwardly extended from the tubular part 60 may be adjusted to suit existing conditions of operation. The lever arm 27', Fig. 2, on the opposite side of the tractor from the lever 27, has all the parts described in the foregoing and this lever arm 27' is raised and lowered in the same manner through hydraulic fluid pressure delivered through a conduit 67'.

A tool bar 72 is connected to the forward end of each lever 27. As shown in Fig. 2, this tool bar 72 extends across the front of the tractor when the levers 27 and 27' are disposed in forwardly extending relation as shown in Figs. 1 and 2, but when the positions of these levers are reversed, the tool bar 72 will extend across the rear of the tractor. At the forward end of each lever 27 and 27' there is a tool bar connection 73. As shown in Figs. 3 and 4, this tool bar connection consists of a fork 74 which is connected to the forward end of the tubular lever 27, this fork 74 supporting a vertical pin 75 on which a block 76 is swingable. The block 76 has a forwardly presented semi-cylindrical depression 77 to receive an arcuate filler piece 78 having a V-shaped seat 79 to receive substantially half of the tool bar 72. This filler piece 78 comprises a rocker which may rock in the depression 77 for the purpose of rotational adjustment of the tool bar 72 by adjustment of a cover plate 80 having a V-shaped seat 81 to engage the outer half of the tool bar 72. The cover plate 80 is clamped against the tool bar by screws 82 which are threaded into the block 76. In Fig. 4 the cover plate 80 is shown in an intermediate position. By loosening one of the screws 82 and tightening the other, one extremity of the cover plate 80 may be swung in toward the corresponding portion of the block 76, thereby moving the cover plate 80 into an angular position which will be transmitted through the seat 81 to the tool bar 72, thereby producing relative rotation between the tool bar and the lever 27 and causing the filler piece 78 to rock in the depression 77. By adjustment of the cover plates 80 at the opposite ends of the tool bar 72 the angular relation of the levers 27 and 27' to the tool bar may be adjusted. For example, by suitable adjustment of the cover plates 80 the levers 27 and 27' may be brought into the same plane so that the tool bar 72 will be level with the tractor tracks. The tool bar may be caused to assume a sloping relation to the horizontal plane defined by the tractor tracks through the simple expedient of swinging one of the levers 27 or 27' into angular relation to the other. Referring to Figs. 3 and 4, loosening of one of the screws 82 and the tightening of the other will cause the block 76 to swing around the axis of the tool bar 72, thereby swinging the lever arm 27 so that its pivot extension 31 will be out of the plane defined by the tool bar 72 and the remaining lever arm 27'. Or, one of the lever arms 27 or 27' may be swung upwardly and the remaining lever arm swung downwardly to bring the pivot extensions 31 of the lever arms 27 and 27' out of the plane defined by the front and rear edges or corners of the tool bar 72. Thereafter, if the pivot extensions 31 are inserted in the openings 29 of the bracket 13, the tool bar 72 will be disposed in sloping relation to the substantially horizontal plane defined by the openings 29. The tool bar 72 may be rotated on its axis by simultaneously adjusting both of the cover plates 80 in the same manner.

The levers 27 and 27' are connected to the brackets 13 so that the forward ends thereof may have a limited lateral swinging movement, and the forward ends of the levers 27 and 27' are pivotally connected through the substantially vertical pins 75 to permit a hinge action between the tool bar 72 and levers 27 and 27', as the levers swing laterally. The purpose of this swinging movement of the levers 27 and 27' is to permit a small change in direction of travel of the tractor for purposes of steering without the necessity of shifting the tool bar 72 and the tools attached thereto laterally while they are in engagement with the soil. The lateral swinging movement of the tool bar 72 and levers 27 and 27' is limited by a chain 85, the intermediate portion of which is connected to an attachment 86 on the front end of the tractor frame. The end portions 87 of the chain 85 are adjustably connected to the forward ends of the levers 27 and 27' by means of tubular members 88 which are connected to the forks 74. As shown in Fig. 10, the tubes 88 are vertically disposed and have notches 89 in the upper portions thereof, each of which will receive a selected link 90 of the chain 85, the excess portion 91 extending through the opening of the tube 88.

The tool supporting structure may be reversed so that the tool bar 72 will extend across the rear of the tractor, without the use of tools. The chains 60 may be disconnected from the forward ends of the supporting arms 21 and 21', and the supporting arms 21 and 21' may be disconnected from the brackets 13 by the simple expedient of lifting their forward ends to disengage the pins 25 and thereafter removing the toes 20 from the socket parts 18. The locking pins 41 may be then removed from the vertical openings 40 so that the pivot extensions 31 can be removed from the openings 29. The structure consisting of the arms 27 and 27' and the tool bar 72 may be then swung around to the rear of the tractor and the pivot extensions 31 reinserted into openings 29 or 30 of the brackets 13 on the sides of the tractor opposite to those previously occupied by the arms 27 and 27', and the pivot extensions 31 may be locked in place by reinsertion of the pins 41. The supporting arm 21' is then reversed and mounted on the near bracket 13 as shown in Fig. 7, the toe 20 of this supporting arm 21' being then inserted in the socket part 18 through the rearward end of the opening 19, and the pin 24 of the supporting arm 21' being then dropped into an opening 25' in the upper wall of the bracket 13 rearwardly of the socket part 18. When the supporting arm 21' is in this new position shown in dotted lines in Fig. 7, its forward or upper end 26 will be in position to receive the chain which extends from the newly positioned lever 27'. In similar manner the supporting arm 21, Fig. 2, is removed from the near bracket 13 and is rotated through an angle of 180° around a vertical axis and mounted on the far bracket 13 so that it will then cooperate with the lever 27 in the new position of the lever 27 when the position of the entire tool supporting structure is reversed from that in which it is shown in Figs. 1 and 2. The swing-limiting chain 85 will be, of course, transferred to a position at the rear of the tractor and its intermediate portion will be connected to the rear of the tractor, so that this chain will then serve to limit the swinging movement of the supporting structure when it is in reversed position.

I claim as my invention:

1. In a tool attachment for tractors, the combination of: a tubular lever to extend along the side of the tractor, the free end of said lever being adapted to support a tool; means for pivotally connecting the other end of said lever to the side of the tractor so that it may be swung in a substantially vertical plane; a bracket for connection to said tractor and having a part extending above said lever; a power operated pulling means carried by said lever, said pulling means comprising a cylinder-piston device in said tubular lever adapted to be actuated by fluid pressure and a part which is moved longitudinally within said lever by said device; a sheave carried by said lever intermediate its ends; means at the outer end of said part for guidingly engaging the inner walls of said lever; and a cable having its upper end connected to said bracket, its intermediate portion trained around said sheave, and its lower end connected to said part of said pulling means, whereby longitudinal movement of said part will exert tension in said cable and the upward reaction of said cable against said sheave will swing said lever upward around the inner pivotally supported end thereof.

2. In a tool attachment for tractors, the combination of: a tubular lever to extend along the side of the tractor, the free end of said lever being adapted to support a tool; means for pivotally connecting the other end of said lever to the side of the tractor so that it may be swung in a substantially vertical plane; a bracket for connection to said tractor and having a part extending above said lever; a power operated pulling means carried by said lever, said pulling means comprising a cylinder disposed in the inner end of said tubular lever, a piston in said cylinder, a carriage movable longitudinally in said lever toward the outer end thereof by said piston as it is actuated in said cylinder; a sheave carried by said lever intermediate its ends, said carriage being connected at its inner end with said piston and extending from said device outwardly beyond said sheave and including means adjacent the outer end for guidingly engaging the inner walls of said lever; and a cable having its upper end connected to said bracket, its intermediate portion trained around said sheave, and its lower end connected to the outer portion of said carriage beyond said sheave, whereby outward movement of said piston in said cylinder causes outward movement of said carriage and will exert tension in said cable and the upward reaction of said cable against said sheave will swing said lever upward around the inner pivotally supported end thereof.

3. In a tool attachment for tractors adapted to be raised by a cable, the combination of: a lever member comprising an inner tubular lever part and an outer tubular lever part connected by walls forming a sheave chamber having a cable opening in the upper portion thereof; a sheave supported in said sheave chamber over which said cable may be trained; means for pivotally connecting the inner end of said lever member to the tractor; and hydraulically actuated power means disposed within said tubular part and extending across said sheave chamber, for connection to the inner end of said cable to exert tension therein whereby the upward reaction of said cable against said sheave will lift said lever member.

4. For use in tool supporting means of the type that is adapted to be mounted on a vehicle and which includes a member adapted to be extended either forwardly or rearwardly with relation to the vehicle, and means on said vehicle for pivotally receiving the inner end of said member in either forwardly or rearwardly extending position; the improvement which comprises raising means adapted to be connected with said member and to extend upwardly therefrom at a point spaced from said pivot means, an arm connectible to the vehicle so as to extend either forwardly or rearwardly and thereby dispose its upper end substantially over said raising means in either position of said member with relation to the vehicle; and means adapted to be carried by said member for operatively moving said raising means.

5. In a tool attachment for tractors, a tool supporting unit comprising a transverse member and a pair of generally fore and aft hollow tubular side members adapted to be pivotally connected with the tractor, a hydraulic cylinder mounted in each of said side members, a piston disposed in each cylinder, a frame member connected at its inner end with each piston and movable within the associated side member, a guide roller carried at the outer end of each frame member in contacting relation with the associated side member, and means extending from each frame member to a point of connection with the tractor for causing the movement of the pistons to raise or lower the associated side members relative to the tractor.

6. In a tool attachment for tractors, a tool supporting unit comprising a transverse member and a pair of generally fore and aft hollow tubular side members adapted to be pivotally connected with the tractor, a hydraulic cylinder mounted in each of said side members, a piston disposed in each cylinder, a frame member connected at its inner end with each piston and movable within the associated side member, guide means at the outer end of each frame member in contacting relation with the associated side member, a sheave carried by each side member generally between the guide means and said cylinder and piston, and cable means extending from the outer portion of each frame member over the associated sheave to a point of connection with the tractor for causing the movement of the pistons to raise or lower the associated side members relative to the tractor.

7. The invention set forth in claim 6, further characterized by said frame members being bifurcated and the bifurcated portions of each member straddling the associated sheave.

8. The invention set forth in claim 6, further characterized by each side member having a generally centrally disposed enlarged section receiving the associated sheave.

9. In a tool attachment for tractors, a tool supporting unit comprising a transverse member and a pair of generally fore and aft hollow tubular side members adapted to be pivotally connected with the tractor, means including a detachable cap connectible to the inner end of each side member for pivotally connecting the latter to the tractor, and a hydraulic unit mounted in each side member so as to have one end in engagement with the associated cap member and the other end operatively connected to act between the associated side member and the tractor, whereby actuation of said hydraulic units serves to raise or lower the associated side members relative to the tractor.

10. In a tool attachment for tractors, a tool supporting unit comprising a transverse member and a pair of generally fore and aft side members adapted to be pivotally connected with the tractor, a pair of brackets attachable to opposite sides of the tractor, each having an opening therein, a thrust exerting power unit carried by each of said side members, a pivot member connected to the inner end of each side member and each pivot member having a pivot extension disposable in the opening in the associated bracket, and a part detachably connected with said pivot member for receiving the thrust of the associated power unit.

11. In a tool attachment for tractors, a tool supporting unit comprising a transverse member and a pair of generally fore and aft side members adapted to be pivotally connected with the tractor, a pair of brackets attachable to opposite sides of the tractor, each having an opening therein, a pivot member connected to the inner end of each side member and each pivot member having a pivot extension disposable in the opening in the associated bracket, and securing means carried by said brackets and engaging said pivot extensions for holding said side members in connection with said tractor.

12. In a tool attachment for tractors, a tool supporting unit comprising a transverse member and a pair of generally fore and aft side members adapted to be pivotally connected with the tractor, means including a pivot member connected to the inner end of each side member for pivotally connecting the latter to the tractor, a detachable cap connectible to the inner end of each side member, a hydraulic unit mounted in each side member so as to react against the associated cap member, a fluid line leading to each unit and including a fitting, the associated cap member having a section receiving said fitting whereby the latter serves to hold the cap member in position on the associated side member.

13. A tool attachment for tractors of the type including a lever to extend either forwardly or rearwardly along the side of the tractor, the free end of said lever being adapted to support a tool: said attachment comprising; bracket means for pivotally connecting the other end of said lever to the side of the tractor so that it may be swung in a substantially vertical plane; a supporting member adapted for connection to said tractor at a point adjacent the point at which said bracket means is disposed, said supporting member being constructed and arranged to be disposed in either forwardly or rearwardly extending position and having a part extending substantially directly above said lever and spaced generally in a fore and aft direction from the points of connection of said bracket means and said supporting member with the side of the tractor; a power operated pulling means carried by said lever; and a tension member extending down from said part and having its lower end connected to said pulling means, said supporting member being reversed from forward to rearward position, or vice versa, relative to the tractor when the position of the lever is reversed, so as to dispose said part substantially in line with said tension member in either position of the lever.

14. A tool attachment for tractors of the type including a lever to extend either forwardly or rearwardly along the side of the tractor, the free end of said lever being adapted to support a tool: said attachment comprising; bracket means for pivotally connecting the other end of said lever to the side of the tractor so that it may be swung in a substantially vertical plane; an arm adapted for connection to said tractor at a point adjacent the point at which said bracket means is disposed, said arm being constructed and arranged to be disposed in either forwardly or rearwardly extending position and having a part extending substantially directly above said lever and spaced generally in a fore and aft direction from the points of connection of said bracket means and said supporting member with the side of the tractor; a power operated pulling means carried by said lever, said pulling means having a part which is moved longitudinally of said lever and within the latter; a guide element carried by said lever; and a flexible tension member extending down from said arm and being trained over said guide element, the lower end of said tension member being connected to said part of said pulling means whereby longitudinal movement of said part will exert tension in said tension member so that the reaction of said tension member against said guide element will swing said lever upward around the inner pivotally supported end thereof said arm being reversed from forward to rearward position, or vice versa, relative to the tractor when the position of the lever is reversed, so as to dispose said part substantially in line with said tension member in either position of the lever.

15. In a tool attachment for tractors of the type including a pair of brackets for attachment to the sides of the tractor intermediate the ends thereof; a tool supporting member adapted for front and rear positions of operation on the tractor and having a cross member to extend across either the front end or the rear end of the tractor and a pair of levers for extending from said cross member along the sides of the tractor; hinge means for connecting the inner ends of said levers to said brackets; and actuating means carried by said levers at points spaced from their connection with said hinge means for vertically moving said tool supporting member: the combination therewith of a pair of supporting arms adapted, respectively, to receive said actuating means, and fore and aft spaced means on each side of the tractor for receiving said arms in optionally different positions whereby the latter are connectible to the tractor in two different positions of operation, said actuating means cooperating in one of its positions with said tool supporting member when said member is in said front position, and cooperating in the other of its positions with said tool supporting member when said tool supporting member is in its rear position.

16. In a tool attachment for tractors, the combination of: a pair of brackets for attachment to the sides of the tractor intermediate the ends thereof, each of said brackets having two base-receiving sections disposed in fore and aft spaced apart relation; a tool supporting member adapted for front and rear positions of operation on the tractor having a cross member to extend across either the front end or the rear end of the tractor and a pair of levers for extending from said cross member along the sides of the tractor; hinge means for connecting the inner ends of said levers to said brackets; a pair of arms, each having a base portion and a force-receiving portion extending in a generally fore and aft direction from the base portion, the base portion of each arm being connectible to the base-receiving section of the associated bracket and said arms being reversible on said brackets from one side to the other of the tractor, whereby to dispose the force-receiving portion of the arm in either of two fore and aft spaced positions; and actuating means carried by said levers and connectible with said force-receiving portions for moving said tool supporting member in either its front or rear position of operation on the tractor 17. A tool attachment for tractors of the type including a lever to extend either forwardly or rearwardly along the side of the tractor, the free end of said lever being adapted to support a tool: said attachment comprising; an attachment bracket connectible to the tractor at one side thereof and having an elongated opening, a pivot member connected to the inner end of said lever and having a laterally inwardly directed extension disposable in said elongated opening, said extension having a portion of reduced diameter, and a locking member releasably carried by said attachment bracket and disposable in the reduced portion of said pivot member extension for releasably locking said pivot member to said attachment bracket.

18. In a tool attachment for tractors, a tool supporting unit comprising a transverse member and a pair of generally fore and aft extending side members adapted to be pivotally connected with the tractor and to extend toward either the front or the rear of the tractor, a pair of attachment brackets connectible to the tractor at opposite sides thereof and each including a generally centrally arranged fore and aft facing socket, a pair of supporting arms, each having a base portion adapted to seat on the associated attachment bracket, a locking portion adapted to enter said socket from either side thereof, and a power-receiving arm portion extending upwardly and outwardly from the base section, said arm portions being adapted to extend generally forwardly or rearwardly, according to whether the supporting arms are mounted on the associated brackets in either forward or rearward positions, interlocking means on each supporting arm and the front and rear portions of each attaching bracket for holding the supporting arms in either of their positions on the associated brackets, and power means acting between said arms and the associated side members in either position of the latter for raising and lowering the side members relative to the tractor.

19. The invention set forth in claim 18, further characterized by a pivot member on each of said side members, and means on each of said attachment brackets for receiving the associated pivot member.

20. The invention set forth in claim 19, further characterized by each attachment bracket having vertically spaced pivot-receiving means to provide for connection of said side members thereto in either an upper or a lower position.

JESSE G. LINDEMAN.

REFERENCES CITED

The following references are of record in the file of this patent:

UNITED STATES PATENTS

| Number | Name | Date |
|---|---|---|
| 1,745,540 | Isbell | Feb. 4, 1930 |
| 1,872,484 | Milhon | Aug. 16, 1932 |
| 1,888,925 | Kroyer et al. | Nov. 22, 1932 |
| 1,923,412 | Bacon | Aug. 22, 1933 |
| 2,075,482 | Thorpe | Mar. 30, 1937 |
| 2,167,166 | Allin | July 25, 1939 |
| 2,173,158 | Corbett | Sept. 19, 1939 |
| 2,187,072 | LeBleu | Jan. 16, 1940 |
| 2,199,674 | Ronning | May 7, 1940 |
| 2,325,870 | Mott | Aug. 3, 1943 |
| 2,328,064 | Doty | Aug. 31, 1943 |
| 2,342,306 | Silver | Feb. 2, 1944 |
| 2,408,268 | Peterson et al. | Sept. 24, 1946 |

FOREIGN PATENTS

| Number | Country | Date |
|---|---|---|
| 4,201 | Great Britain | Nov. 24, 1910 |